April 15, 1958   R. W. HYRE   2,830,855
SCAFFOLDING CONNECTION
Filed Feb. 2, 1955

INVENTOR.
ROBERT WARREN HYRE
BY
J. Harold Kieserpf
ATTORNEY

United States Patent Office 2,830,855
Patented Apr. 15, 1958

2,830,855

SCAFFOLDING CONNECTION

Robert Warren Hyre, Chattanooga, Tenn.

Application February 2, 1955, Serial No. 485,753

5 Claims. (Cl. 304—40)

This invention relates to improvements in scaffolding, and more particularly to an improved connection for securing the braces to the end and/or ladder frames of sectional scaffolding.

An object of the invention is the provision of a connection as aforesaid characterized by simple construction and design, and which is moreover capable of greatly increasing the speed of erection of scaffolding and at the same time of giving a high security factor thereto.

Another object of the invention is the provision of a connection as aforesaid which comprises a shoulder bolt adapted to be rigidly affixed to the scaffolding end and/or ladder frame and an attaching end on the brace, wherein the shoulder bolt and attaching end are so constructed and arranged that the latter may be engaged with the bolt by a simple hook-on operation, and thereupon effectively prevented from separating from the bolt simply by drawing or pushing the hookably engaged parts together in the direction of the axis of the bolt.

Yet another object of the invention is the provision of a shoulder bolt and hook-on attaching end type of connection as aforesaid, wherein said attaching end is specially fashioned and constructed so as to facilitate its being hooked to the shoulder bolt.

A further object of the invention is the provision of a shoulder bolt and hook-on attaching end type of connection of the stated character, which preferably makes use of a nut serving not only to prevent accidental separation of the connected parts following their engagement, but also effectively to protect the threads on the bolt on which it travels and to provide a reservoir for supplying lubricant to said threads.

Yet a further object of the invention is the provision of a connection as last stated, wherein the nut is secured against removal from the shoulder bolt, thus to prevent it from being accidentally backed off the bolt either in the assembly or disassembly of the scaffolding or consequent to the scaffolding being subjected to vibration.

A still further object of the invention is the provision of a scaffold brace to scaffold end and/or ladder frame connection incorporating a shoulder bolt onto which the brace end or ends are hooked and a wing nut turnable on the bolt, which is so constructed and arranged that tightening of the wing nut compresses brace end or ends against the bolt shoulder, thereby to render the scaffold very steady to work on as compared to most scaffolds in use at the present time.

The above and other objects and advantages of a scaffolding brace-to-end or ladder frame connection according to the invention will appear from the following detailed description thereof, in which reference is had to the accompanying drawing illustrating a preferred physical form thereof, in which—

Figure 1:
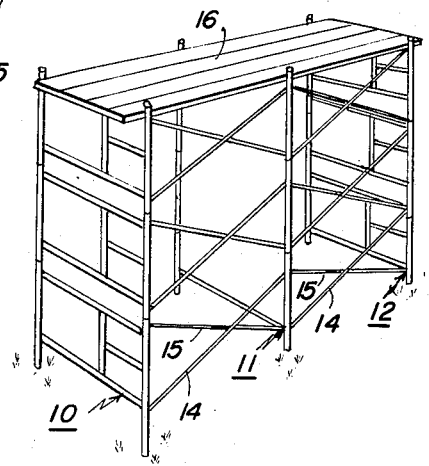
Fig. 1 is a perspective view illustrating a typical scaffolding employing the improved brace-to-end-frame connection of the invention.

Referring to the drawings, Fig. 1 illustrates a typical form of sectional scaffolding which comprises so-called end frames 10, 11 and 12 held in erected condition by a plurality of pairs of pivoted cross braces 14, 15 which extend between and brace the corresponding side posts of the frames, the scaffolding supporting a platform 16. Both said end frames and said braces may be and preferably are of standard construction and hence these parts form no part of the present invention except in so far as they enter into the claimed combination or combinations directed to the brace-to-end frame connection forming the subject-matter of the invention.

Since the cross braces serve the important function of maintaining the end frames and hence the scaffolding as a whole in set-up or erected position, the connection between said parts must be of a construction and character giving a high degree of security. At the same time, since scaffolding of the form illustrated is of sectional construction, the aforesaid connection must be one which can be made and broken quickly, and with a minimum of effort, thus to speed up and simplify both the erection and dismantling of the scaffolding. Also, when the number of brace-to-end frame connections required for even a small scaffolding is considered, it will be appreciated that the form of connection employed must be of simple and inexpensive construction.

The aforesaid conflicting requirements of a scaffolding cross brace-to-end frame connection are ably satisfied by the connection of the invention. As seen more particularly in Figs. 2 and 3, such a connection comprises a shoulder bolt generally designated 20, a specially formed attaching end generally designated 30 formed on or provided at each end of every brace, and preferably also a wing or thumb operated locking nut 35 of special construction threadedly mounted on the shoulder bolt.

Figure 2:
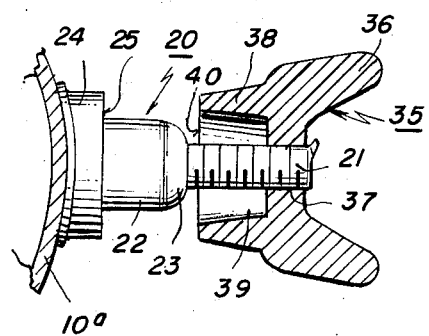
Fig. 2 is an enlarged section taken through a frame post just above such a connection and prior to engagement of the brace therewith, which illustrates the shoulder bolt and locking nut component of the connection.

Referring to Fig. 2, the shoulder bolt 20 illustratively comprises a threaded end portion 21 having appreciable axial length, a cylindrical shoulder section 22 (shown to be unthreaded but which may be threaded also) having somewhat larger diameter than said threaded end portion and being defined therefrom by a shoulder 23 which is preferably rounded, the shoulder section terminating at its back end in a head 24 having an under face 25 which is square with respect to the axis of the bolt as is conventional. The outer or front face of the head 24 may be curved to correspond to the curvature of a side post 10a of the end frame to which the bolt is rigidly affixed as by welding. Alternatively, the head 24 may be omitted, in which case the shoulder section 22 connects directly to the side post 10a.

Figure 3:
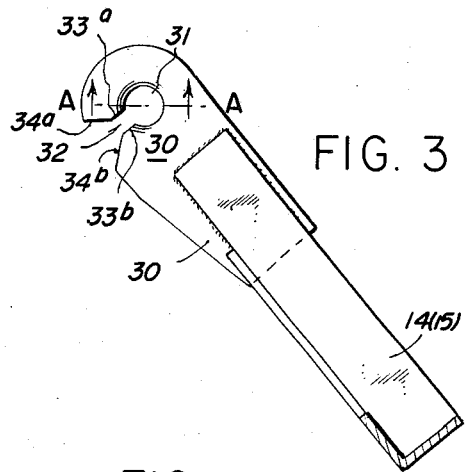
Fig. 3 is an enlarged plan view of the attaching end formed on or provided at the ends of each brace.
Figure 3A:
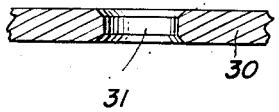
Fig. 3A is a section taken on line A—A of Fig. 3.

As seen in Fig. 3, the attaching end 30 as formed on or provided at each end of all cross braces preferably comprises a flat hook element which may be fashioned from strip stock and secured at one end as by welding to one flange of its brace 14 or 15, which latter has, illustratively, conventional L-section, although it may have other angle section or it may be formed tubular. It is a feature of the invention that in its free end portion the hook member is formed with a part-circular hole 31 whose edge is beveled as in Fig. 3A and which opens through a side edge thereof via a slot 32 extending between said hole and side edge. The walls or edges which define said slot include parallel portions 33a, 33b, together defining a narrow neck at the hole end thereof, and oppositely inclined or tapered portions 34a, 34b which define the mouth or entrance end of the slot, said tapered edge portions serving both to widen the entrance end of the slot and as oppositely disposed wedge surfaces which facilitate hooking of the hook member over its shoulder bolt, particularly when said parts are not in perfect alignment.

Also, according to the invention, the diameter of the hole 31 is slightly larger than that of the shoulder portion 22 of the bolt 20, whereas the width of the narrow neck portion of the slot 32, while slightly greater than the diameter of the threaded end portion 21 of the bolt, is less than the aforesaid diameter of the shoulder portion. Hence, to connect the hook member 30 with the shoulder bolt 20, said hook member must first be hooked on to the threaded end portion 21 of the bolt and then pushed sidewise (axially) towards the bolt head 24. It follows that when the hook member is engaged or hooked over the shoulder portion 22 of the bolt, it can be unhooked only by reversing this operation, that is to say, the hook member must be backed off or moved axially along the bolt until its hole encircles the threaded end portion of the latter. Sidewise movement of the hook member in either direction is of course facilitated by the beveling of the edge of the hole 31.

The aforesaid nut 35 which is threadedly carried on the threaded end portion 21 of the shoulder bolt as aforesaid serves to prevent accidental reversal of the hook member 30 as above. Said nut may be provided with wings 36 so as to function as a manually operated wing nut. In addition to its threaded bore 37, into which the threaded end 21 of the bolt threads, it is provided with a sleeve portion 38 having a counterbore 39 opening through the inner end face 40 of the nut. If said counterbore is tapered as shown, its minimum diameter is slightly greater than the diameter of the shoulder portion 22 of the bolt. However, the counterbore may be smooth-cylindrical and of diameter slightly greater than that of said shoulder portion or, if the shoulder portion be threaded as suggested in the above, the counterbore will be cylindrical and correspondingly threaded.

To enable the nut 35 to exercise direct holding effect on the attaching end or ends of one or more cross braces hooked to the shoulder bolt 20, the axial length of the counterbore 39 is slightly greater than the difference between the axial length of the shoulder 22 (distance between the back face 25 of the bolt head 24 and the shoulder 23) and the thickness of one attaching end 30. Accordingly, when the attaching end of a single brace is engaged with the bolt shoulder and the nut 35 is tightened thereagainst, said attaching end is gripped between the end face 40 of the nut sleeve 38 and said back face of the bolt head. Similarly, when the attaching ends of two or more braces are engaged with the bolt shoulder (it will be understood that the axial length of said shoulder will always be such as to mount at least two attaching ends), tightening of the nut 35 will press said ends together and against the bolt head.

Figure 4:
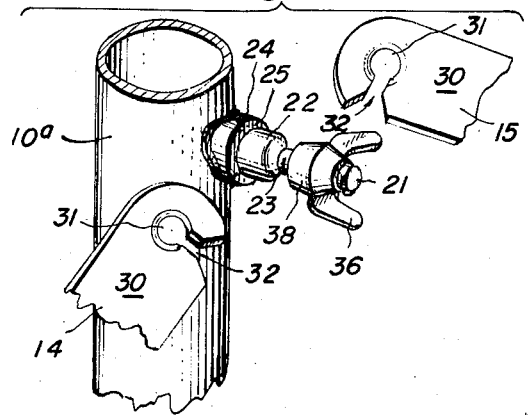
Fig. 4 is a perspective view illustrating a connection about to be effected between the ends of opposed braces and a shoulder bolt.
Figure 5:
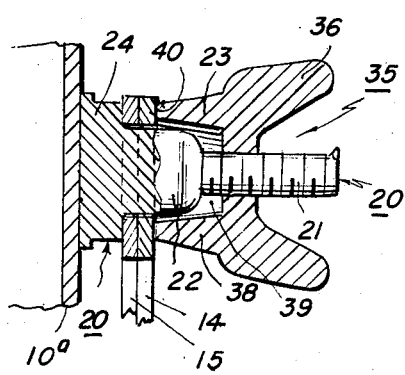
Fig. 5 is a section taken axially through the parts illustrated in Fig. 4 following completion of the connection.

The manner in which a connection according to the invention is assembled and thereupon operates will be seen from an analysis of Figs. 4 and 5. In Fig. 4 the attaching ends of two oppositely arranged braces are shown in proximity to the shoulder bolt 20, in readiness to be hooked thereto. This hook-on engagement of each attaching end is effected by relating the slot 32 of each end sidewards of the threaded end portion 21 of the bolt, with the nut 35 backed off by an amount as to expose a substantial length of said threaded end. Upon the attaching end of each brace being hooked to the threaded end portion 21 of the bolt, both said attaching ends are pushed axially along the shoulder portion 22 of the bolt, the holes 31 in the attaching ends of the braces providing for such movement. Upon the inner attaching end engaging against the back face 25 of the bolt head 24, the wing nut is tightened, as shown in Fig. 5, thereby to lock said attaching ends against accidental or unintentional reversing movement as could result in disengagement of one or both of the attaching ends from the shoulder bolt.

Preferably, the wing nut 35 is secured against complete separation from the threaded end portion 21 of the shoulder bolt. Thus, there is no likelihood of the wing becoming detached from its bolt during the erection or dismantling of the scaffolding as would slow down these operations. Where the counterbore 39 in the sleeve end 38 of the nut is tapered as shown, the larger diameter end of the bore may be utilized as a reservoir for a lubricant serving to lubricate the complemental threads of nut and bolt, thereby insuring easy tightening and backing off of the nut with respect to bolt. It will also be observed that the axial elongation of the nut as results from the formation of a sleeve on the inner end thereof results in the sleeve end of the nut offering substantial protection to the threads of the threaded end 21 of the bolt.

Without further analysis, it will be seen that a scaffolding brace-to-end frame connection according to the invention achieves the objectives therefor set forth above. Consequent to its simple construction and design, such a connection greatly increases the speed of erection and dismantling of scaffolding as compared to prior connections serving similar function, and at the same time provides a high degree of security in the erected scaffolding. The scaffolding brace-to-end frame connection according to the invention is also notable in that, while it may be effected by simple hook-on and axial movement of the end of a brace with respect to a bolt, the breaking of the connection requires a studied reverse movement of the attaching end relative to bolt, which is not likely to occur accidentally, whereby the security of the connection is enhanced as compared to prior connections serving similar function. Since the connection also preferably includes a locking nut functioning in positive manner to prevent any reverse movement of attaching end with respect to bolt, it will be clear that when once made the connection is maintained for all practical purposes until it is positively and intentionally broken.

As many changes could be made in carrying out the above constructions without departing from the scope of the invention, it is intended that all matter contained in the above description or shown in the accompanying drawing shall be interpreted as illustrative and not in a limiting sense.

I claim:

1. A connection for connecting the cross braces to the end frames of scaffolding comprising, in combination, a shoulder bolt affixed at its head end to a frame part so as to extend outwardly therefrom, the shank end of the bolt including a shoulder section which is located adjacent the head and a threaded end portion, of which the shoulder section has substantially uniform diameter greater than that of the threaded end portion, a hook-form attaching end on a cross brace having a part-circular hole of diameter slightly greater than that of the shoulder section, said hole communicating with a side edge of said attaching end through a slot having width which is greater than the diameter of the threaded end portion but less than the diameter of the shoulder section, whereby the attaching end of the brace can be hookably engaged with the shoulder section of the bolt only by first hooking it over the threaded end portion of the bolt and thereupon moving it axially over and along said shoulder section and can be disengaged from the bolt only by reversing said operations, and means movable axially along the shoulder section for normally maintaining said attaching end hooked to said shoulder section following its engagement therewith as aforesaid.

2. A connection as set forth in claim 1, wherein the means for maintaining the attaching end of the brace hooked on to the shoulder section of the bolt comprises a nut threaded onto the threaded end portion of the bolt, said nut being constructed and arranged so as to be tightened against an attaching end hooked onto the shoulder section of the bolt, thereby to prevent unintentional reversing movement of said attaching end.

3. A connection as set forth in claim 1, wherein the means for maintaining the attaching end of the brace hooked on to the shoulder section of the bolt comprises a nut threaded onto the threaded end portion of the bolt, said nut having a coaxial sleeve portion on its inner end which defines a bore having diameter at least as great as that of the shoulder section, the axial length of said bore being slightly greater than the difference between the axial length of the shoulder section and the thickness of one attaching end, whereby tightening of the nut effects securement of the attaching end between the inner end of the sleeve and the bolt head.

4. A connection for connecting the cross braces to the end frames of scaffolding comprising, in combination, a shouldered brace-end securing member affixed at its head end to a frame part so as to extend outwardly therefrom, a hook-end on a cross brace and being hooked onto the securing member, and complemental means on said securing member and said hook end requiring relative axial movement between said parts both in connecting and disconnecting them.

5. A connection for connecting a cross brace to an end frame of scaffolding comprising, in combination, a shouldered brace-end securing member having a shoulder section of substantially uniform diameter and a smaller-diameter end section and being fixed at the head end of its shoulder section to a frame part so as to extend outwardly therefrom, said cross brace having a generally hook-shaped attaching end defined in part by a part-circular opening of diameter slightly greater than that of said shoulder section and by a slot extending from said opening to a side edge of said attaching end and having width intermediate the diameters of the shoulder and end sections of said securing member, whereby to hookably connect the attaching end of the brace to said securing member it must first be hooked over said smaller diameter end section and thence moved axially along said shoulder section of the securing member and to disconnect said attaching end from the securing member it must first be moved axially from said shoulder section, and releasable means for normally maintaining the attaching end of the brace hookably engaged with the shoulder section of said brace-end securing member.

References Cited in the file of this patent

UNITED STATES PATENTS

| | | |
|---|---|---|
| 1,204,552 | Ekholm | Nov. 14, 1916 |
| 1,229,240 | Day | June 12, 1917 |
| 1,390,485 | Bell | Sept. 13, 1921 |
| 1,787,017 | Paul | Dec. 20, 1930 |
| 1,909,941 | Finch | May 23, 1933 |
| 1,981,705 | Morris | Nov. 20, 1934 |
| 1,998,936 | Luce | Apr. 23, 1935 |
| 2,043,850 | Folk | June 9, 1936 |
| 2,467,688 | Oertle | Apr. 19, 1949 |
| 2,561,938 | Meng et al. | July 24, 1951 |
| 2,601,385 | Graham | June 24, 1952 |

FOREIGN PATENTS

| | | |
|---|---|---|
| 495,157 | Belgium | Aug. 1, 1950 |